United States Patent [19]

Graham

[11] 4,336,522
[45] Jun. 22, 1982

[54] VEHICLE SEAT-OCCUPANCY RECORDER

[76] Inventor: Kenneth G. Graham, 23 Apple Orchard Path, Thornhill, Ontario, Canada, L3T 3B5

[21] Appl. No.: 85,017

[22] Filed: Oct. 15, 1979

[51] Int. Cl.³ .............................................. B60Q 1/26
[52] U.S. Cl. .............................. 340/52 R; 235/30 R; 340/68; 340/667
[58] Field of Search ...................... 340/52 R, 573, 667, 340/68; 200/85 A; 235/30 R, 30 A; 364/467

[56] References Cited

U.S. PATENT DOCUMENTS 3,325,097  6/1967  Slutsky ............................ 235/30 A
3,809,312  5/1974  Warrick et al. ............. 235/30 A X
4,001,777  1/1977  Alexander ....................... 340/667 X Primary Examiner—John W. Caldwell, Sr.
Assistant Examiner—Joseph E. Nowicki
Attorney, Agent, or Firm—Ridout & Maybee

[57] ABSTRACT

Unoccupied passenger seats in a vehicle are sensed and a totalizing recorder such as an odometer is controlled in response to this sensing to provide an indication of the extent of vehicle use which is weighted according to the degree of occupancy of the vehicle. An external signal may be used to indicate whether a desired degree of occupancy is achieved.

2 Claims, 2 Drawing Figures

VEHICLE SEAT-OCCUPANCY RECORDER

FIELD OF THE INVENTION

This invention relates to means for recording the extent of seat occupancy of a vehicle. Such a device would assist in taxing or charging vehicles for road use on the basis of seat occupancy or in obtaining statistics relating thereto.

BACKGROUND OF THE INVENTION AND PRIOR ART STATEMENT

It is known to provide devices to indicate the occupancy of individual seats in a motor vehicle, such as the pressure switches commonly utilized in conjunction with seatbelt warning and interlock systems. In this invention, seat occupancy as indicated by such devices is recorded as a function of some parameter of vehicle operation such as time of operation or mileage travelled.

SUMMARY OF THE INVENTION

According to the invention, means for recording the extent of seat occupancy of a vehicle comprises means to sense occupancy of at least one seat of the vehicle other than the driver's seat, and a totalizing recorder responsive to the degree of operation of the vehicle, the rate of response of said recorder being controlled by said sensing means.

SHORT DESCRIPTION OF THE DRAWINGS

Exemplary embodiments of the invention are described below with reference to the accompanying drawing, in which FIGS. 1 and 2 are schematic diagrams of embodiments of the invention.

DESCRIPTION OF THE PREFERRED EMBODIMENTS

Figure 1:
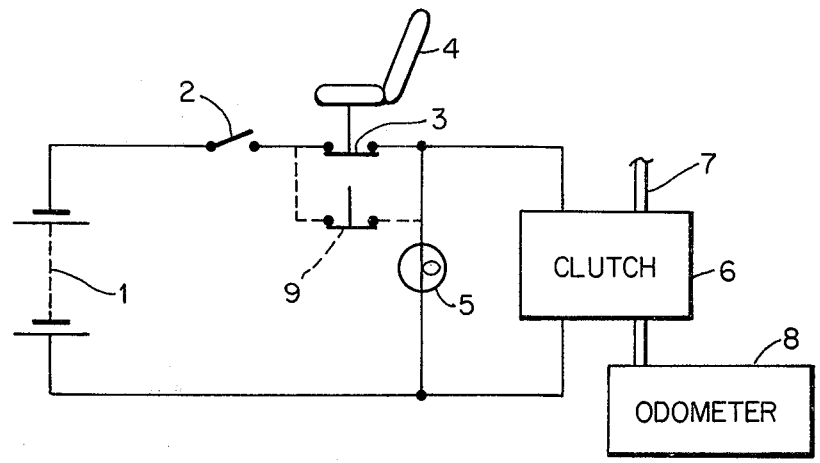

Referring to FIG. 1, an electric circuit powered from the battery 1 of a vehicle through the vehicle ignition switch 2 comprises a normally closed pressure operated switch 3 mounted beneath a front passenger seat 4 of the vehicle in series with an indicator lamp 5 mounted externally of the vehicle, the lamp being in parallel with a small electromagnetically actuated clutch 6 which when energized couples a drive shaft or cable 7 connected to the vehicle speedometer and odometer drive to a supplementary odometer 8. If desired, pressure switches 9 mounted under additional passenger seats of the vehicle can be connected in parallel with the switch. In operation, the lamp 5 will be illuminated and the odometer 8 engaged whenever the seat or any one of the seats equipped with pressure switches 3 or 9 is unoccupied, thus indicating that the vehicle is carrying less than a desired complement of passengers. If the system is used as the basis of a road usage pricing or metering or other control system, the lamp 5, which is otherwise optional, provides an external indication of whether the vehicle is carrying the desired passenger complement and also assists in defeating attempts to cheat the system by weighting unoccupied seats.

It will be appreciated that numerous variations are possible upon the basic arrangement set forth above. Rather than pressure switches, any other switch means responsive to seat occupancy may be utilized. The switches 3 and 9 may be normally open switches and connected in series instead of in parallel, in which case the operation of the lamp and odometer will be reversed so as to indicate and record when the desired number of passengers is being carried. The clutch could be arranged to disengage an energization so as to reverse its mode of operation.

Figure 2:
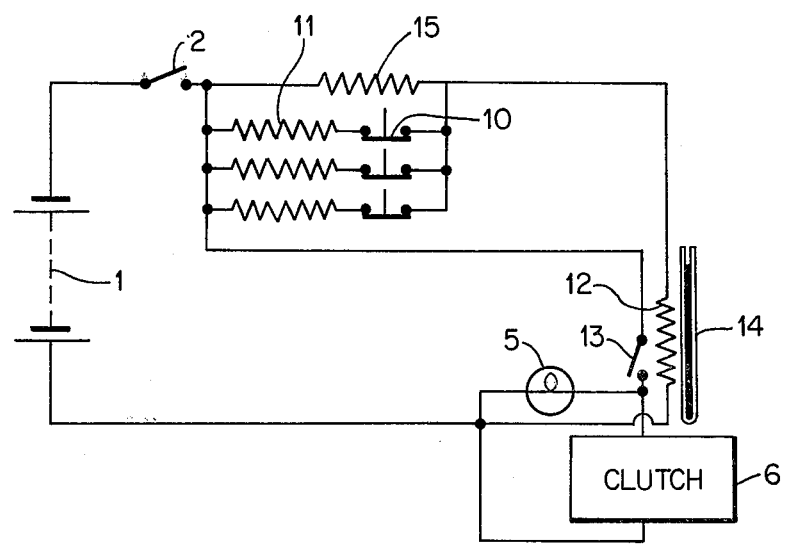

Some further possible variants are shown in FIG. 2. Parallel normally closed pressure switches 10 beneath the vehicle passenger seats are connected in series with resistors 11 so that the current through a resistance 12 is proportional to the number of passenger seats unoccupied. The supply of current to the lamp 5 and the clutch 6 is controlled by a thermally operated switch 13 adjacent the resistance 12 and calibrated so as to close when the current through the resistance is above a level corresponding to a give number of unoccupied seats indicated by closed switches 10. As a further addition, or in substitution, for the clutch 6 and its associated odometer, a metering device 14 of a type similar to those used to meter heating use in central heating systems may be placed adjacent the resistance 12 so as to meter vehicle usage. Such devices comprise a glass capillary tube filled with a coloured slightly volatile high boiling point liquid. The level of the liquid in the tube drops slowly at a rate proportional to the temperature of the tube, or in this case at a rate proportional to the number of seats unoccupied when the vehicle is in use. A resistor 15 may be added in parallel with the resistors 11 and switches 10 so that the liquid will be evaporated at a certain minimum rate whenever the vehicle is operated, and at a progressively higher rate as additional seats are unoccupied. Temperature sensitivity may be reduced by placing the device in the passenger compartment of the vehicle. Such a device will provide a record based on the time that a vehicle is operated rather than the mileage travelled, and will therefore, if used as a basis for metering vehicle use, discourage driving in congested areas. It will of course be understood that other techniques for recording vehicle operation time in a manner weighted in accordance with seat occupancy could be utilized. The potential developed across the resistance 12 could be utilized to control a variable modulus multiplier in the drive circuit for an additional odometer read-out in an electronic digital speedometer so as to provide a weighted mileage readout, or a similar multiplication technique could be applied by varying the clock frequency applied to an elapsed time meter.

What I claim is:

1. In apparatus for recording the degree of occupancy of passenger seats of a vehicle comprising means to sense occupancy of at least one passenger seat of the vehicle, a totalizing recorder responsive to the extent of operation of the vehicle, and means responsive to said sensing means for controlling said recorder, the improvement wherein the sensing means senses the number of passenger seats occupied, and the response means is adapted to control the rate of incrementation of the totalizing recorder in proportion to the number of seats unoccupied.

2. Apparatus according to claim 1, further comprising an indicator lamp external of the vehicle, said indicator lamp being controlled by the response means.

* * * * *